(12) United States Patent
Ryu

(10) Patent No.: US 6,961,305 B2
(45) Date of Patent: Nov. 1, 2005

(54) POLARITY-ALTERNATED PULSE WIDTH CDMA AND METHOD FOR MEASURING DISTANCE USING THE SAME

(75) Inventor: Seung Moon Ryu, Sungnam-Si (KR)

(73) Assignee: Casuh Corporation (KR)

( * ) Notice: Subject to any disclaimer, the term of this patent is extended or adjusted under 35 U.S.C. 154(b) by 869 days.

(21) Appl. No.: 09/892,690

(22) Filed: Jun. 27, 2001

(65) Prior Publication Data

US 2002/0126645 A1 Sep. 12, 2002

(30) Foreign Application Priority Data

Nov. 23, 2000 (KR) ......................................... 2000-70051

(51) Int. Cl.[7] ............................. H04J 7/00; H04B 7/216
(52) U.S. Cl. ....................... 370/212; 370/310; 370/320; 370/335; 370/342
(58) Field of Search ................................ 370/212, 310, 370/335, 342, 320

(56) References Cited

U.S. PATENT DOCUMENTS

| | | | | |
|---|---|---|---|---|
| 5,175,743 A | * | 12/1992 | Crespo et al. | ............... 370/210 |
| 5,504,773 A | * | 4/1996 | Padovani et al. | ........... 375/130 |
| 5,894,473 A | * | 4/1999 | Dent | ........................... 370/342 |

* cited by examiner

Primary Examiner—Huy D. Vu
Assistant Examiner—Cynthia L. Davis
(74) Attorney, Agent, or Firm—Cantor Colburn LLP

(57) ABSTRACT

Disclosed is a method for modulating data for a polarity alternated pulse width code division multiple access (PAPW/CDMA) system and a method for measuring a distance between communicating equipments using the PAPW/CDMA. The method for modulating data includes the steps of multiplying CDMA signals inputted from multiple channels by a selected mask pattern, selecting the mask pattern among predetermined mask patterns that have the least peak value, truncation of multiplied CDMA signals according to a predetermined magnitude of levels to form level-number-reduced signals, converting the level-number-reduced signals to pulse width to generate modulated signals having a constant level, and alternately switching a starting polarity of pulses of the modulated signals between "high" and "low". The method for measuring a distance between two mobile stations using a polarity-alternated pulse width CDMA method, comprising the steps of transmitting a first frame by a first mobile station, receiving the first frame by a second mobile station, and transmitting a second frame by the second mobile station upon reception of the first frame, wherein the first mobile station measure the distance by subtracting a frame length from an entire delay time to form a second value, dividing the first value by 2 to form a second value, and multiplying the second value by transmitted signals.

2 Claims, 12 Drawing Sheets

(A) Signal Waveform of the Conventional DS/CDMA Method (B) Converted Pulse width wave form of (A)

(C) Waveform of the PAPW/CDMA Method

POLARITY-ALTERNATED PULSE WIDTH CDMA AND METHOD FOR MEASURING DISTANCE USING THE SAME

BACKGROUND OF THE INVENTION

The present invention relates to a polarity-alternated pulse width code division multiple access (PAPW/CDMA) conceived to resolve the inherent problems of the conventional direct sequence (DS)/CDMA that modulated output has the multiple level; i.e., the present invention is capable of enhancing power efficiency of a system by controlling a transmitted modulation waveform to have a binary form as in time division multiple access (TDMA), which necessitates neither an RF amplifier requiring linearity at a transmitting terminal nor an A/D converter to process binary signals at a receiving terminal. In particular, the present invention relates to a method for preventing deterioration of the system performance due to a certain data pattern by applying a mask pattern to input data. The present invention also relates to a method for measuring a distance between communicating equipments using a polarity alternated pulse width CDMA. The technology of multiplexing for wireless transmission is classified into three methods: a frequency division multiple access (FDMA); a TDMA; and a CDMA. Of those, the CDMA has been chosen as an international standard in the IMT-2000 system, which is referred to as the third generation mobile communications, thank to its superiority in general characteristics despite the complexity in its realization, after a fierce competition with TDMA in the second generation mobile communications.

The CDMA, a multiple access method based on the technology of a spread-spectrum system, is referred to as a spread-spectrum multiple access (SSMA) method.

From the historical perspective, the spread-spectrum principle has been developed during the outbreak of the $1^{st}$ World War and the $2^{nd}$ World War. Spread-spectrum technology originated from the concept that interference can be overcome by spreading the spectrum of signal has become a subject of intense research since 1950s to be mainly used for military communications and satellite communications. With the recent evolution of the semiconductor technology in integrity and operating speed as well as the microprocessor technology, the spread-spectrum system is used even in the commercial mobile communications in addition to the military communications and satellite communications.

The spread-spectrum system is basically classified into three kinds depending on the methods for spreading the spectrum of signal: direct-sequence (DS) spread spectrum, frequency-hopped (FH) spread spectrum, and time-hopped (TH) spread spectrum.

Among them, the CDMA system using a DS spread spectrum adopts a manner of spreading the spectrum of signal by directly modulating, i.e., by multiplying the data sequence carrier by a broadband spreading signal. The spreading signal composed of +1 and −1 is referred to as spreading sequence, spreading code or code sequence. A transmitted spreading signal arrives at a receiver in a form distorted by noise, interference or signal disturbance, etc. The receiver multiplies the received signal by the spread signal that is identical to that used by a transmitter to de-spread the received signal spectrum of which is spread.

However, the conventional DS/CDMA simultaneously transmits signals of multiple channels through linear summation. Thus, an increase in the number of channels results in an increase in the number of the output signal levels, and the amplitude subsequently becomes variable as in case of analog signals. Therefore, a linear amplifier has to be used to amplify a high frequency to maintain the linearity of modulated signal at the transmitter; the signal has to be processed as a multi-bit after digitizing through the analog/digital converter at the receiver. This is very complicated process. Such complexity of the DS/CDMA is expected to result in difficulties in designing and realizing the system as the significance of the mobile communications increases and the transmission rate of wireless communications goes higher in the future.

FIG. 1 is a block diagram illustrating a module of a conventional DS/CDMA transmitter.

Referring to FIG. 1, input signals $d1, d2, \ldots, dn$ are multiplied by orthogonal code patterns $c1, c2, \ldots, cn$ by means of multipliers $1a, 1b, \ldots, 1n$, respectively. The multiplied signals are summed up by an adder 10 to form an analog signal $\{s\}$ of n+1 levels and to be transferred to a radio frequency (RF) amplifier (not shown in the figure). In the conventional DS/CDMA, it becomes complicated to maintain the linearity of signal characteristics such that a linear amplifier has to be used to amplify a high frequency to maintain the linearity of modulated signal at the transmitter; the signal has to be processed as a multi-bit after digitizing through the analog/digital converter at the receiver, as mentioned above.

SUMMARY OF THE INVENTION

Accordingly, it is a first object of the present invention to provide a PAPW/CDMA for converting a variety of modulated signal levels generated in the DS/CDMA into pulse width and changing output signal levels to binary levels to keep the envelop of output signal constant. The present invention is to prevent steady increase in the bandwidth of the modulated signal as the number of channels increases by eliminating the variation at the boundary of the code chips providing alternating polarities of the pulse widths in each chip of the modulated signals and a deterioration of a system performance caused by a certain pattern.

A second object of the present invention is to provide a method, applicable to diverse fields, capable of measuring a distance between communicating parties during communication through an accurate measurement of transmission delay between the transmitter and the receiver by utilizing the characteristic that the synchronization circuit of PAPW/CDMA is elaborate because PAPW/CDMA signals are represented by the pulse width.

To achieve the first object of the present invention, each input signals from multiple CDMA channels is multiplied by a mask pattern which is selected among predetermined mask patterns that have the a least peak value and truncated according to the predetermined magnitude of levels to form level number-reduced signals which is converted to pulse width signals to form modulated signals having a constant level and the starting polarity of every pulse of the modulated signals switches alternately between "high" and "low".

To achieve the second object of the present invention, a first mobile station transmits a frame of data, a second mobile station receives the frame and transmits a frame of data upon reception of the frame; wherein the first mobile station measures the distance by subtracting the delay time required to transmit frames from an entire delay time to form a first value; dividing the first value by 2 to form a second value; and multiplying the second value by a transmission velocity of transmitted signals.

BRIEF DESCRIPTION OF THE DRAWINGS

The above and other objects, features and advantages of the present invention will become more apparent from the following detailed description in conjunction with the accompanying drawings, in which.

DETAILED DESCRIPTION OF THE PREFERRED EMBODIMENT

Figure 1:
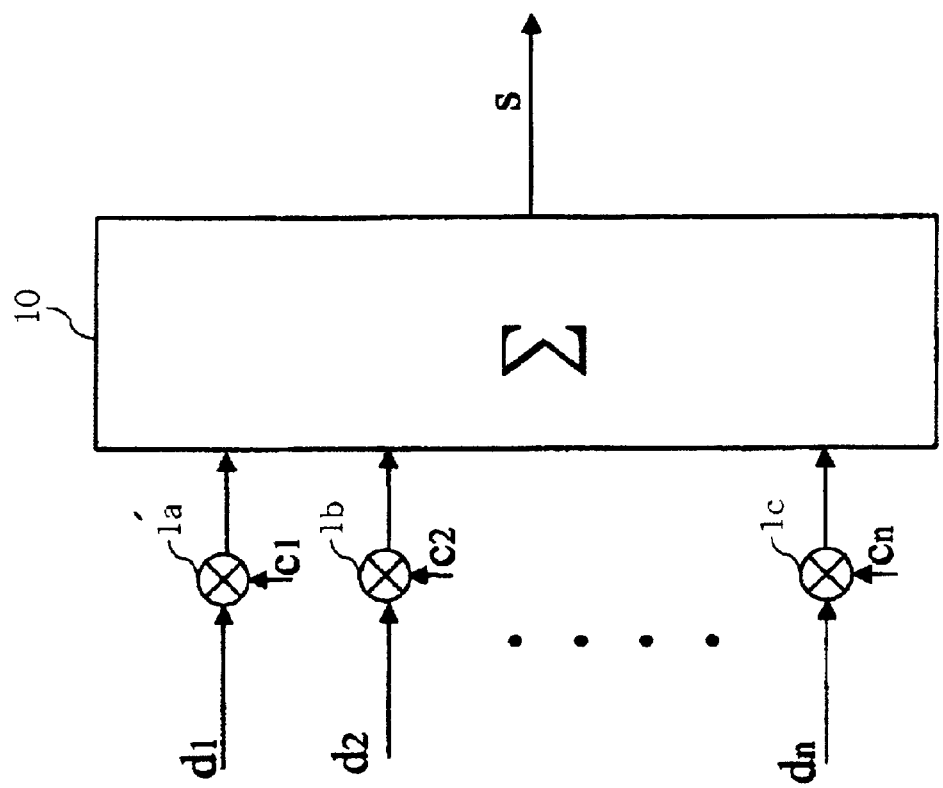
FIG. 1 is a block diagram illustrating a module of a DS/CDMA transmitter according to the conventional technology.

A preferred embodiment of the present invention will be described herein below with reference to the accompanying drawings. In the following description, well-known functions or constructions are not described in detail since they would obscure the invention in unnecessary detail.

A principle of the DS/CDMA will first be explained prior to describing the present invention in detail.

To simultaneously transmit data of multiple channels with the same frequency at a transmitting terminal of the conventional DS/CDMA system, data of each channel are multiplied by one of different orthogonal codes which are orthogonal to each other and have a transmission rate faster from tens to thousands of times than the data transmission rate so that each channel may not interfere with the others. Thereafter, the multiplied data are summed up and transmitted to the receiving terminal. Subsequently, the receiving terminal receives the transmitted signal, and multiplies it by the same orthogonal code used by the transmitting terminal so as to get the data of a desired channel only removing the data of undesired channels.

At this stage, the receiving terminal extracts data by summing up the area for one bit of transmitted data multiplied by the orthogonal code (correlation).

Therefore, it is the principle of the present invention that the correlation result according the present invention is same with that of conventional DS/CDMA because the signal level of conventional DS/CDMA is converted to the pulse width, even though the waveforms of those two methods are different.

As we have the same result as the conventional DS/CDMA in the present invention, the waveform of the modulated signals transmitted takes a binary form unlike the conventional DS/CDMA. Therefore, it is unnecessary to transmit signals of various levels, and the maximum output can be always available for an RF amplifier without considering the linearity. As a result, power efficiency is enhanced, and a receiver circuit can be designed simply because a demodulator circuit may process the binary data only.

In that case, however, the pulse widths are classified as detail as the number of signal levels, and a higher sampling rate is required in proportion to the number of signal levels. Thus, the pulse width may become narrower, and the bandwidth may become wider. Furthermore, the modulated signal level may become overly high in a certain data pattern, and too many energy may be truncated in the course of truncation when converting signal levels to pulse widths. Then the system performance may be deteriorated and the system may hardly be realizable.

The present invention is to resolve the above problems that the sampling rate becomes higher in proportion to the number of channels, and that the bandwidths become wider due to narrow pulse widths. The present invention is also to improve the drawback that the signal level becomes higher in a certain data pattern.

The problem that the sampling rate becomes higher in proportion to the number of channels can be resolved by reducing the number of levels through truncation of signal levels according to a given threshold when converting the conventional DS/CDMA signal levels to pulse widths. For example, if the number of channels is 256, the number of levels is 257. Even if all the levels above 16 are truncated, the truncated parts are less than 5% of the entire signal energy. Therefore, the system can be realizable by increasing the sampling rate of the receiving terminal to only 16 times instead of 256 times. The variation of the correlated values ranged merely within 5% scarcely affects the performance of the receiving terminal.

Because the peak value of the signal level becomes high when the correlation value between a certain data pattern and the orthogonal code pattern is high, however, to reduce this peak value, a mask pattern, which is selected among predetermined mask patterns that have the least peak value, is multiplied by each data channel to transmit. There are two methods to learn a selected mask pattern at the receiving terminal. The one is that the receiving terminal extracts the selected mask pattern based on the transmitted data by its own aid. The other one is that the transmitting terminal explicitly transmits the selected mask pattern via transmission channel.

The problem that the bandwidth becomes wider due to narrowed pulse widths can be resolved by taking the symmetry of the pulse waveform of every other chip, so that the area of a pulse in a chip remains same and we avoid the transition between high and low at the boundary of every chip. Thus we can reduce the increase in bandwidth and get the same result when taking correlation at the receiving terminal. Since the process of taking the symmetry of the waveform of each chip is just the same as alternating the starting polarity of the pulse of every chip, the signal generated in this manner was named Polarity-Alternated Pulse Width (PAPW)/CDMA.

The following is a detailed description of the present invention with the accompanying drawings.

Figure 2:
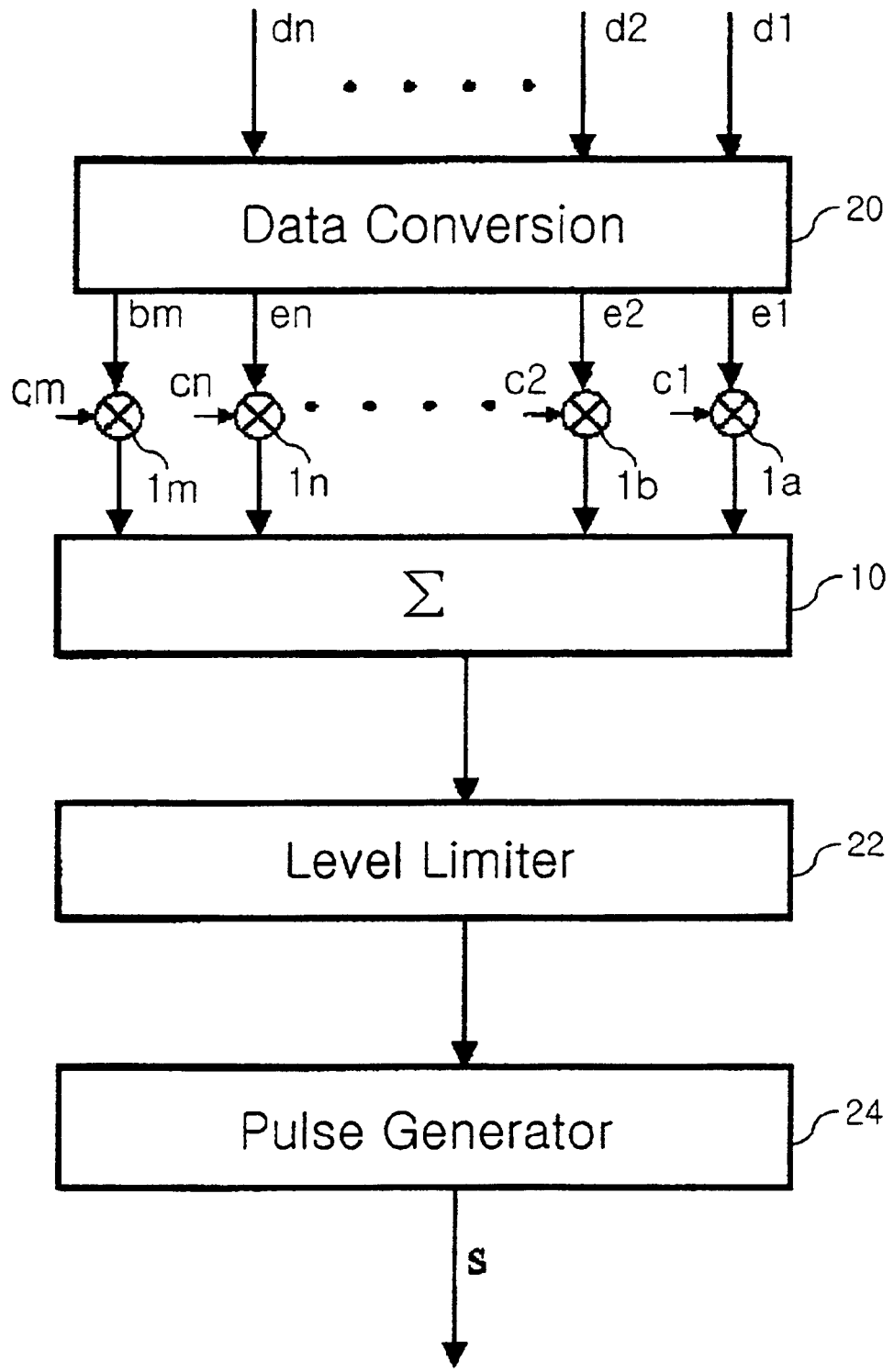
FIG. 2 is a block diagram illustrating a module of a PAPW/CDMA transmitter according to the present invention.

FIG. 2 is a block diagram illustrating a PAPW/CDMA transmitter module according to the present invention.

Referring to FIG. 2, data d1, d2, ..., dn are multiplied in advance by mask patterns at a data converter 20 to generate new data e1, e2, ..., en so that the level magnitude truncated at a level limiter 22 is minimized. Modulated signals are generated according to the conventional method illustrated in FIG. 1 using these new data and bits representing the types of mask patterns used for the data conversion. The generated signals with multiple levels are truncated to remain the magnitude of levels less or equal level k (here, k is an integer smaller than n) only at the level limiter 22, and the remained signals are mapped to one of k pulse widths at a pulse generator 24. The k-level pulse widths are transferred to an RF amplifier (not shown in the drawing).

Figure 3:
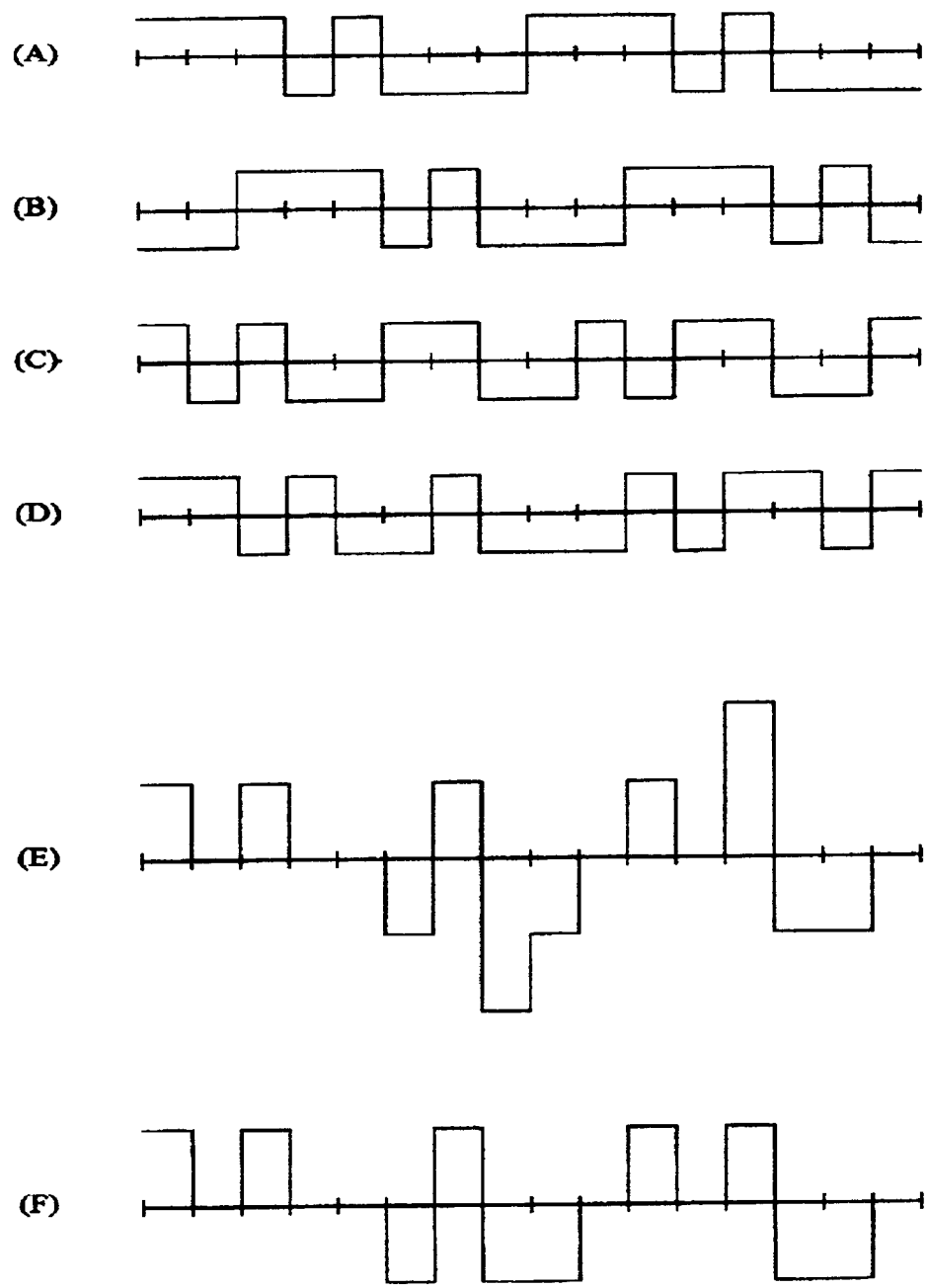
FIG. 3 is a diagram comparing multi-level signals of four channels in the conventional DS/CDMA with truncated signals according to the present invention.

FIG. 3, a diagram comparing multi-level signals of four channel conventional DS/CDMA with truncated signals of the present invention, shows the process taken at the level limiter 22 in FIG. 2.

Referring to FIG. 3, the data multiplied by the mask patterns are multiplied by orthogonal codes corresponding to each channel so as to generate signals (A), (B), (C), (D) of four channels respectively. These four signals, (A), (B), (C) and (D), are summed at an adder 10 to be a signal (E). Since the number of channels is four, the maximum level of the summed signal is five. If the top and the bottom of magnitude are truncated, the signals have three levels like (F). The embodiment of the present invention exemplifying a case of changing five-level-signals to three-level-signals does not clearly shows a difference, but the linear portion of the linear amplifier is drastically reduced under the real circumstances where the signals of 129 level magnitudes are changed to the signals of 17 level magnitudes or where the signals of 1024 level magnitudes are changed to the signals of 16 level magnitudes.

Figure 4:
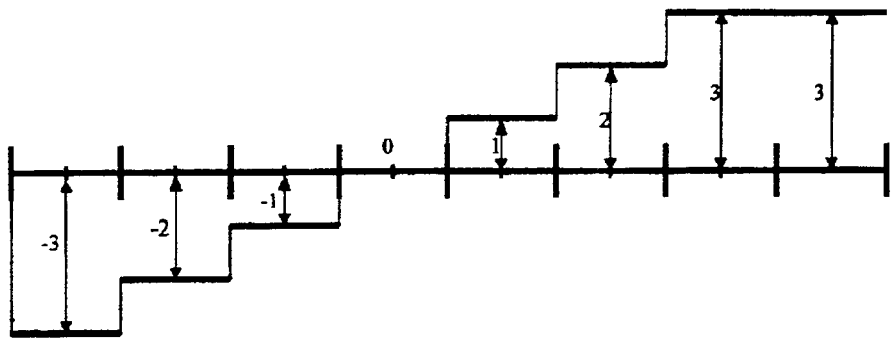
FIG. 4 is a diagram illustrating principle of converting the levels of the conventional DS/CDMA signal to pulse widths of the PAPW/CDMA signal according to the present invention.
Figure 4:
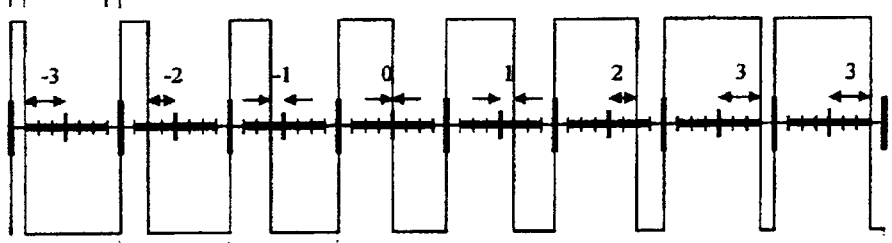
Figure 4:
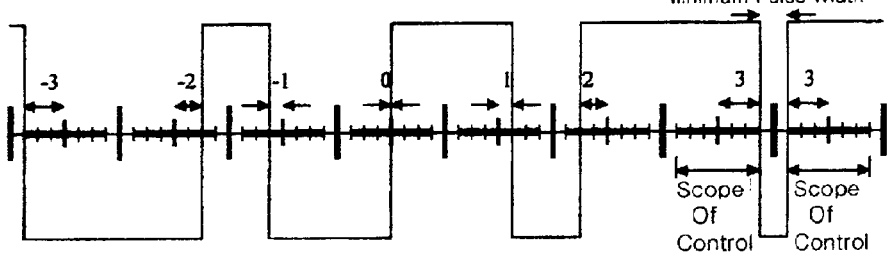

FIG. 4 is a diagram illustrating principles of converting the levels of the conventional DS/CDMA signals to pulse widths of the PAPW/CDMA signals according to the present invention, which is a process taken at the pulse generator 24 in FIG. 2. FIG. 4(A) is a diagram illustrating a signal of the conventional DS/CDMA according to the magnitude of levels in ascending order and FIG. 4(B) is a diagram illustrating a conversion of each signal level to pulse widths, respectively.

As shown in FIG. 4(A), each level magnitude represents height from 0 level. In FIG. 4(B), the scope of control representing a maximum variable range of the pulse widths from the center of each chip is set (the maximum variable range is always smaller than the pulse width of a single chip), and is divided by the number of levels so that the level magnitude in FIG. 4(A) is represented with the pulse width corresponding to that level. The waveform begins with "high" at the initial part of each chip and is transited to "low" at the point corresponding to the pulse width. According to the aforementioned method, if the signal levels of each chip in FIG. 4(A) are converted to pulse widths shown in FIG. 4(B) then the multi-level signals look like binary signals having a constant level. However, sign of pulses is switched in each chip, and the pulse width of the modulated signals get narrower in accordance with an increase in the number of channels. As a result, the bandwidths of the modulated signals become wider. As shown in FIG. 4(C), this drawback is resolved by taking the symmetry of pulse waveform of every other chip and keeping the others still. By doing so, the transition of waveform at the boundary of every chip in FIG. 4(B) can be removed while the characteristics of pulse width of each chip in FIG. 4(B) is maintained same and pulse widths get wider comprehensively than those in FIG. 4(B). As a consequence, despite an increase in the number of channels the signals have a constant bandwidth like the conventional TDMA. Whereas the pulse waveform in FIG. 4(B) begins with "high" at the initial part of each chip, the pulse waveform in FIG. 4(C) begins with "high" or "low" in every other chip.

Figure 5A:
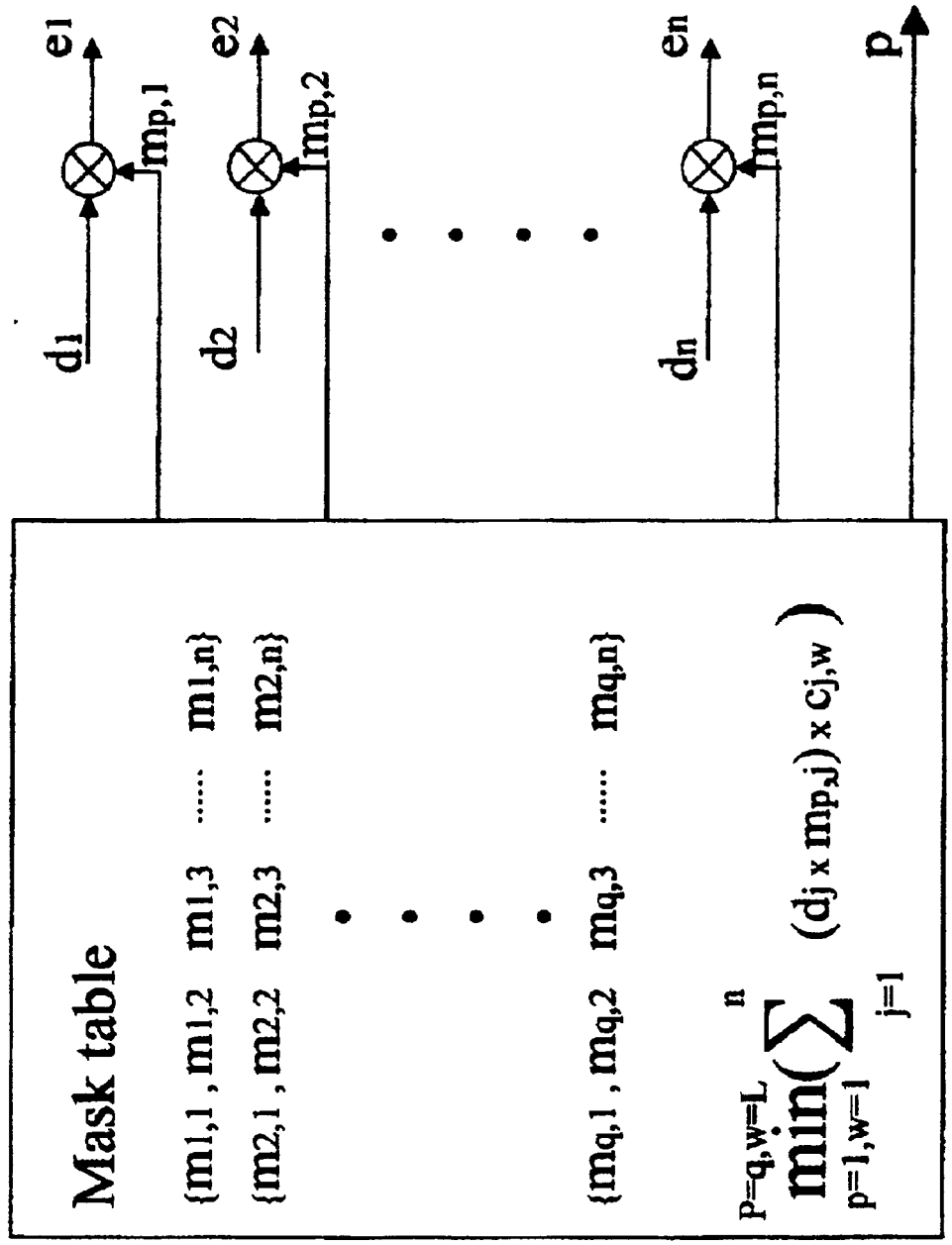
FIG. 5A is a block diagram illustrating a method for converting data pattern in the transmitting terminal by using a mask pattern according to the present invention.
Figure 5B:
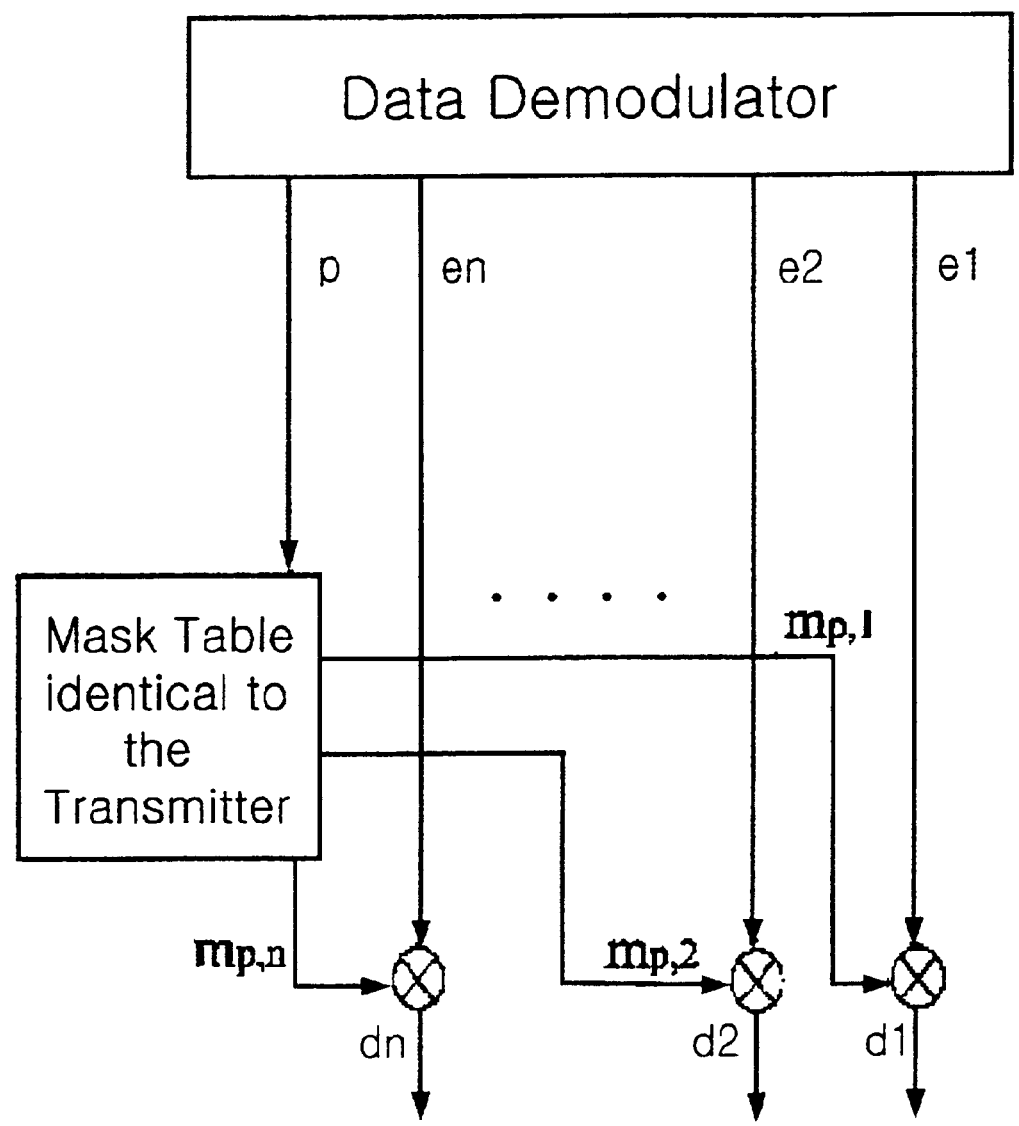
FIG. 5B is a block diagram illustrating a method for demodulating data in the receiving terminal by using the mask pattern identical to that used by the transmitting terminal.

FIGS. 5A and 5B are block diagrams illustrating a method for enhancing the system performance by masking to prevent deterioration caused by a certain data pattern. To reduce the peak value at level limiter, some mask patterns are predetermined, one of which is selected to have the least peak value and multiplied by each data channel and transmitted along with data channels. The receiving terminal, after demodulating data, retrieves the original data using the same mask pattern used in transmitter.

The process of deciding a mask pattern by the transmitting terminal comprises the steps of: multiplying the data received from an input terminal by q mask patterns in advance; correlating for length L with n orthogonal codes to select a mask pattern P having the least correlation value; transmitting the values e1, e2, ..., en obtained by multiplying the data by the mask pattern P; transmitting the selected mask pattern P via a separate channel. The process of restoring the original data by the receiving terminal comprises the steps of: demodulating the values e1, e2, ..., en and the mask pattern P; and restoring the original data d1, d2, ..., dn by using a mask table, which is the same as the mask pattern used by the transmitter.

Figure 6A:
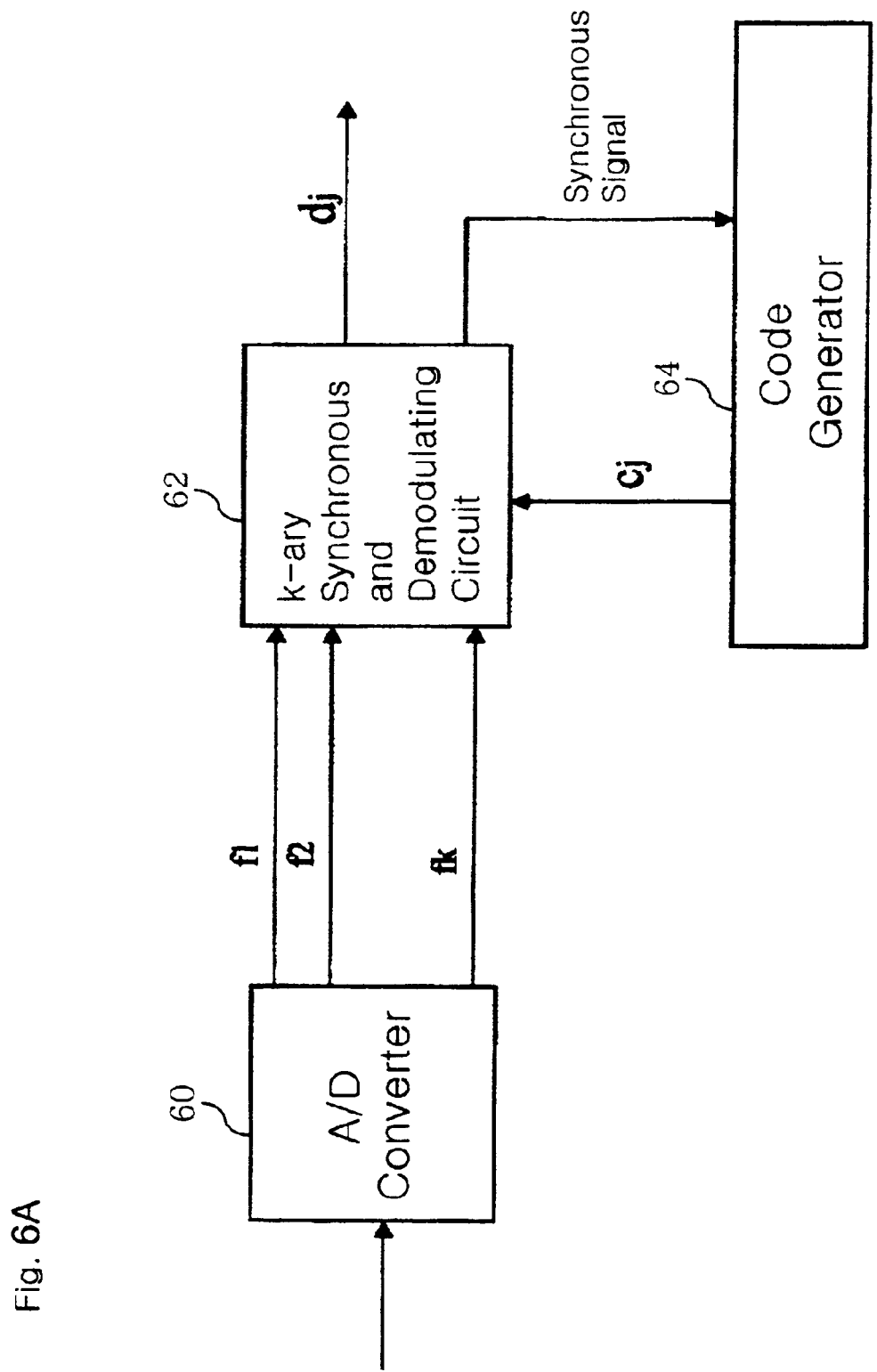
FIG. 6A is a block diagram illustrating a structure of a conventional DS/CDMA receiver.
Figure 6B:
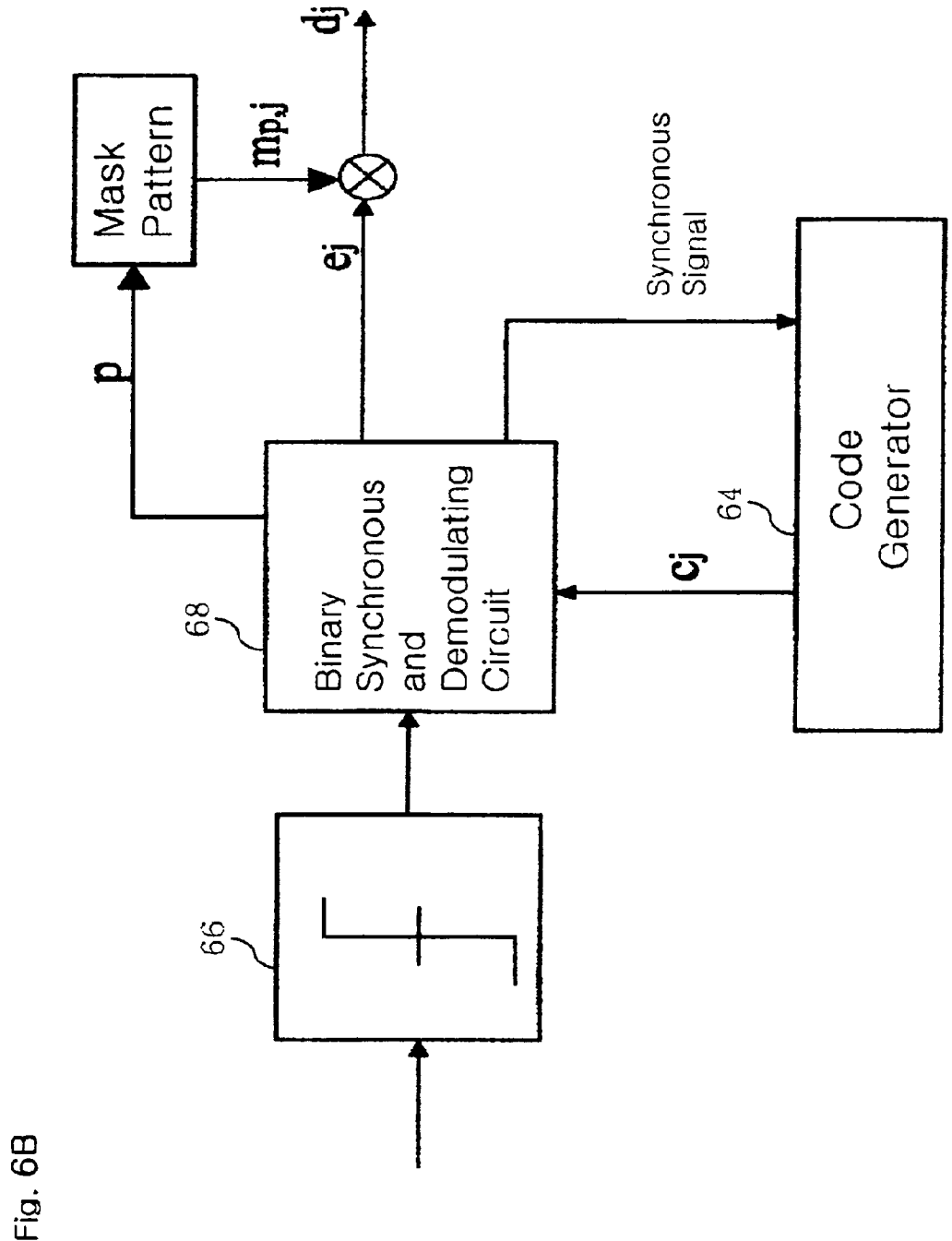
FIG. 6B is a block diagram illustrating a structure of a receiver according to the present invention.

FIG. 6A is a block diagram illustrating a structure of a conventional DS/CDMA receiver. FIG. 6B is a block diagram illustrating a structure of a receiver according to the present invention. Referring to FIG. 6A, the received analog signals are converted to digital signals by means of an analog/digital converter 60 so as to produce k-ary signals f1, f2, ..., fk in binary form, which are processed to produce final data dj with a code pattern cj that is generated at the code generator 64 according to the synchronous signals from the k-ary synchronous and demodulating circuit 62.

Meanwhile, unlike the DS/CDMA in FIG. 6A, a structure of the receiver according to the present invention, shown in FIG. 6B, includes a hard limiter 66 instead of the analog/digital converter for truncating the received signal to have a certain value of envelop regardless of the amplitude of received signal to remove spike noise. Synchronous signals are transmitted to the code generator 64 by a binary synchronous and demodulating circuit 68 to receive the code pattern cj. After demodulating the received data ej and the mask pattern P with code pattern cj, the final data dj is restored by the method to be described in FIG. 7.

Figure 7:
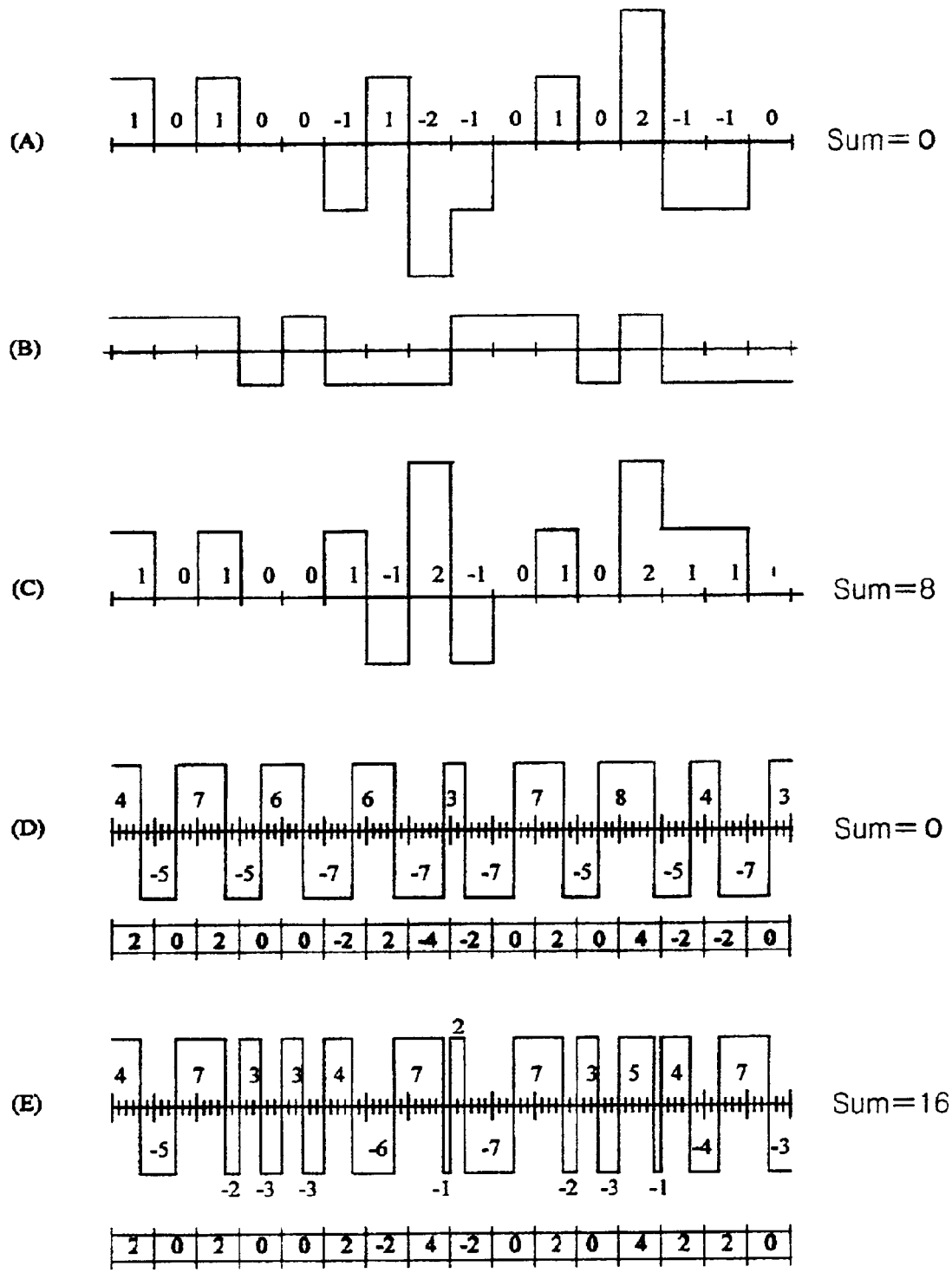
FIG. 7 is a diagram comparing the concept of demodulation in terms of the binary synchronous and demodulating circuit shown in FIG. 6B with the concept of demodulation in the conventional DS/CDMA.

FIG. 7 is a diagram comparing the concept of demodulation in the binary synchronous and demodulating circuit shown in FIG. 6B with the concept of demodulation in the conventional DS/CDMA. FIG. 7(A) is the same as FIG. 3(E) representing a summation of four channels of the DS/CDMA as well as input signals of the receiver. In this case, summing the area of the waveform (A) in full cycle of the code pattern results in a nil value 0 (1+0+1+0+0−1+1−2−1+0+1+0+2−1−1+0=0). However, if the code pattern in FIG. 7(B), which is the same code pattern c1 as the one in FIG. 3(A) that has been generated by transmitting a synchronous signal to the code generator 64 by the k-ary synchronous and demodulating circuit 62 in FIG. 6A, is multiplied by the code pattern in FIG. 7(A), the resultant code pattern is as shown in FIG. 7(C). Thus, summing the area of the waveform (C) in full cycle of the code pattern as in the previous case results in a positive value 8 (1+0+1+0+0+1−1−2−1+0+1+0+2+1+1+0= 8) to show that the transmitted data is 1.

FIG. 7(D) is a diagram illustrating a modulated waveform generated by the method according to the present invention. Referring to FIG. 7(D), summing the area of the waveform (D) in full cycle of the code pattern results in a nil value 0 (4−5+7−5+6−7+6−7+3−7+7−5+8−5+4−7+3=0). However, if the code pattern c1 in FIG. 7(B) is multiplied by the code pattern in FIG. 7(D) results in the code pattern in FIG. 7(E). Thus, summing the area of the waveform (E) in full cycle of the code pattern results in a positive value 16 (4−5+7−2+ 3−3+3−3+4−6+7−1+2−7+7−2+3−3+5−1+4−4+7−3=16) to show that the transmitted data is 1.

Illustrating the area shown in (D) and (E) of FIG. 7 in accordance with each chip becomes numerical values as shown at the bottom of waveform (D) and (E) of FIG. 7 respectively. Those values are twice the values in (A) and (C) of FIG. 7. This means that using the PAPW/CDMA according to the present invention enables modulation of signals in the same patterns as in the conventional DS/CDMA. Whereas the conventional DS/CDMA requires a k-ary signal processing of multi-levels by the receiving terminal, PAPW/CDMA has an advantage of enabling synchronization and demodulation of signals with the binary signal processing alone.

Figure 8:
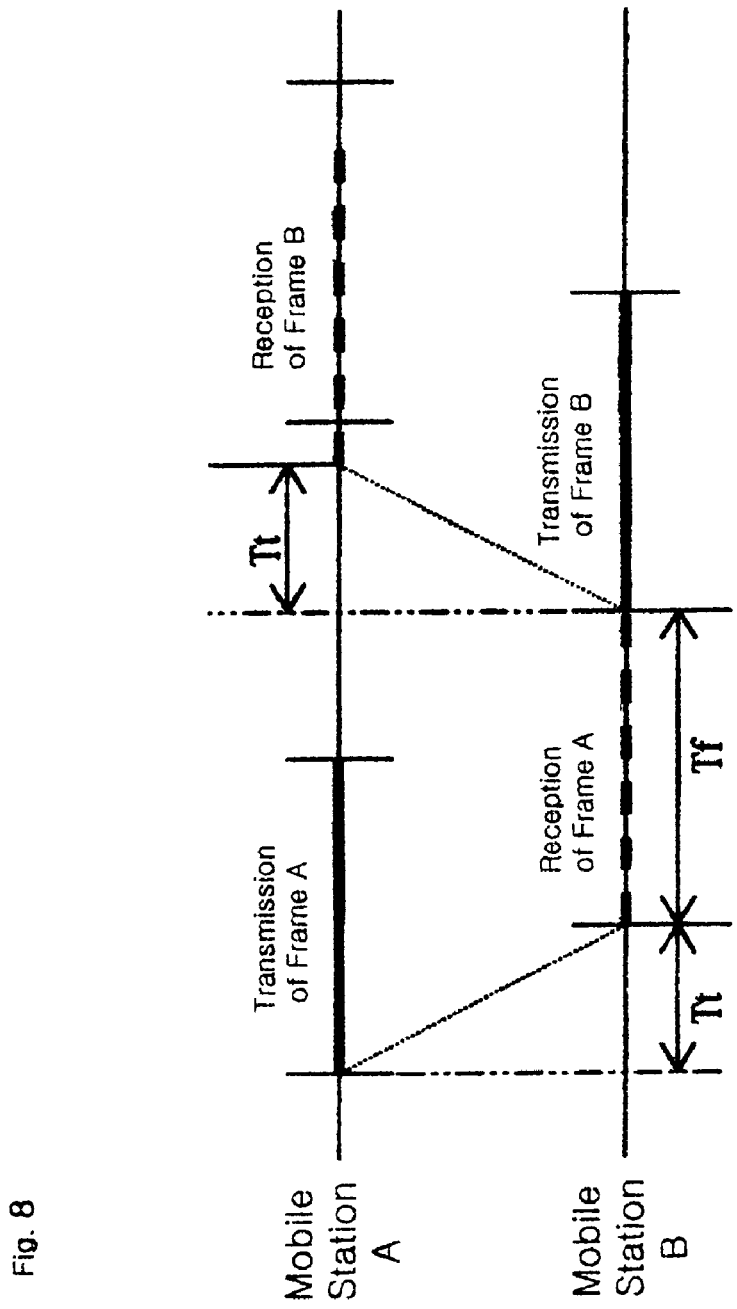
FIG. 8 is a diagram illustrating a protocol structure for measuring distance according to the PAPW/CDMA of the present invention.

FIG. 8 is a diagram illustrating a structure of a protocol for measuring distance according to the PAPW/CDMA. Referring to FIG. 8, Frame A transmitted by a mobile station A arrives at a mobile station B or a relay station after elapse of a transmission delay time Tt, and the mobile station B or the relay station immediately transmits Frame B of its own upon receiving of the Frame A of the length Tf. The Frame B arrives at the mobile station A after delay of the time Tt. The mobile station A subtracts the frame length Tf from the entire delay time, divides the remaining time into two, and multiplies by the transmission velocity of the transmitted signals to obtain a distance between the two stations.

Figure 9:
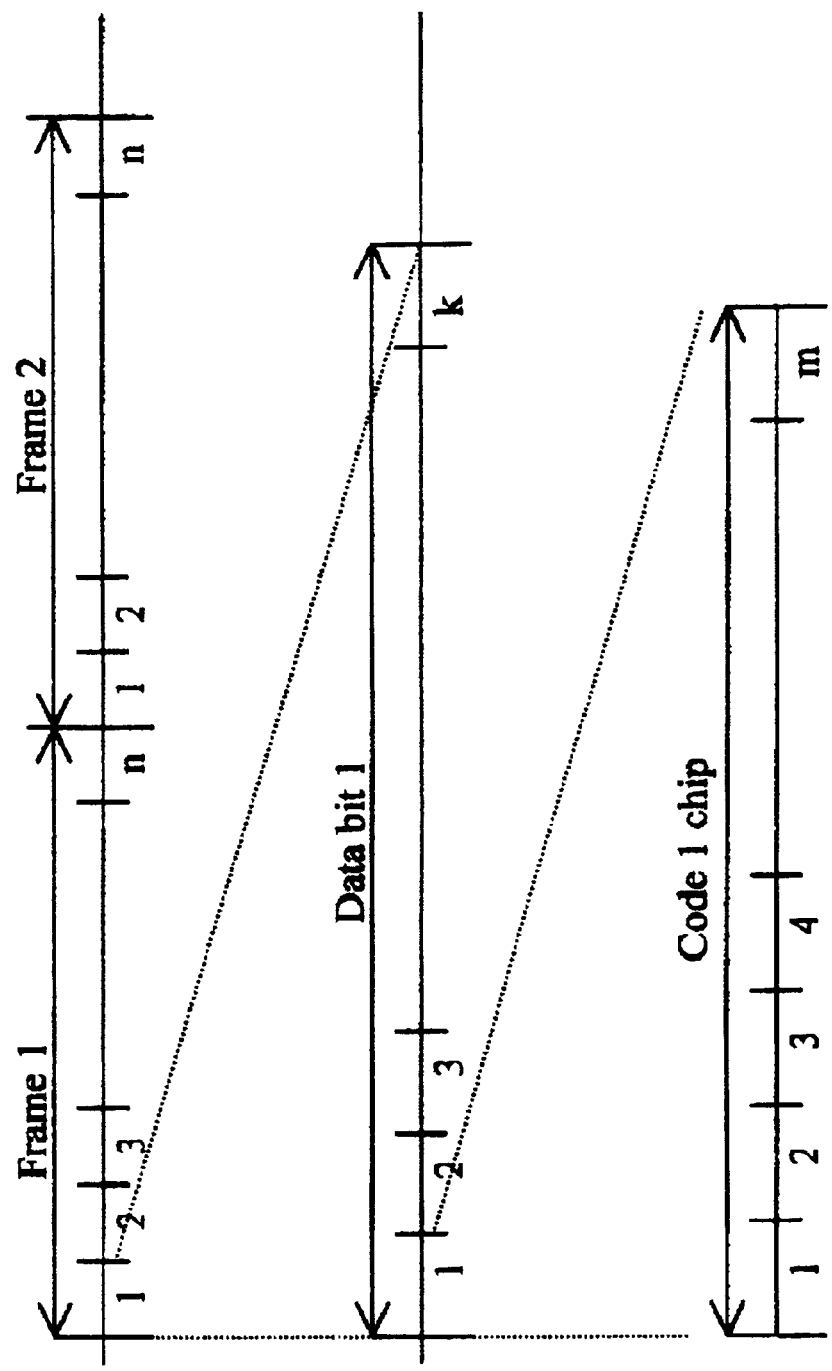
FIG. 9 is a diagram illustrating a signal format for measuring distance according to the PAPW/CDMA of the present invention.

FIG. 9 is a diagram illustrating a signal format for measuring distance according to the PAPW/CDMA. Referring to FIG. 9, one frame is composed of n bits of data, while one bit of the data is composed of k code chips. One code chip is divided into m pulse widths. Therefore, the distance can be measured m times more accurate than in the ordinary spread spectrum signal. In other words, the resolution of distance measurement becomes the light velocity/(chip rate*m).

Figure 10:
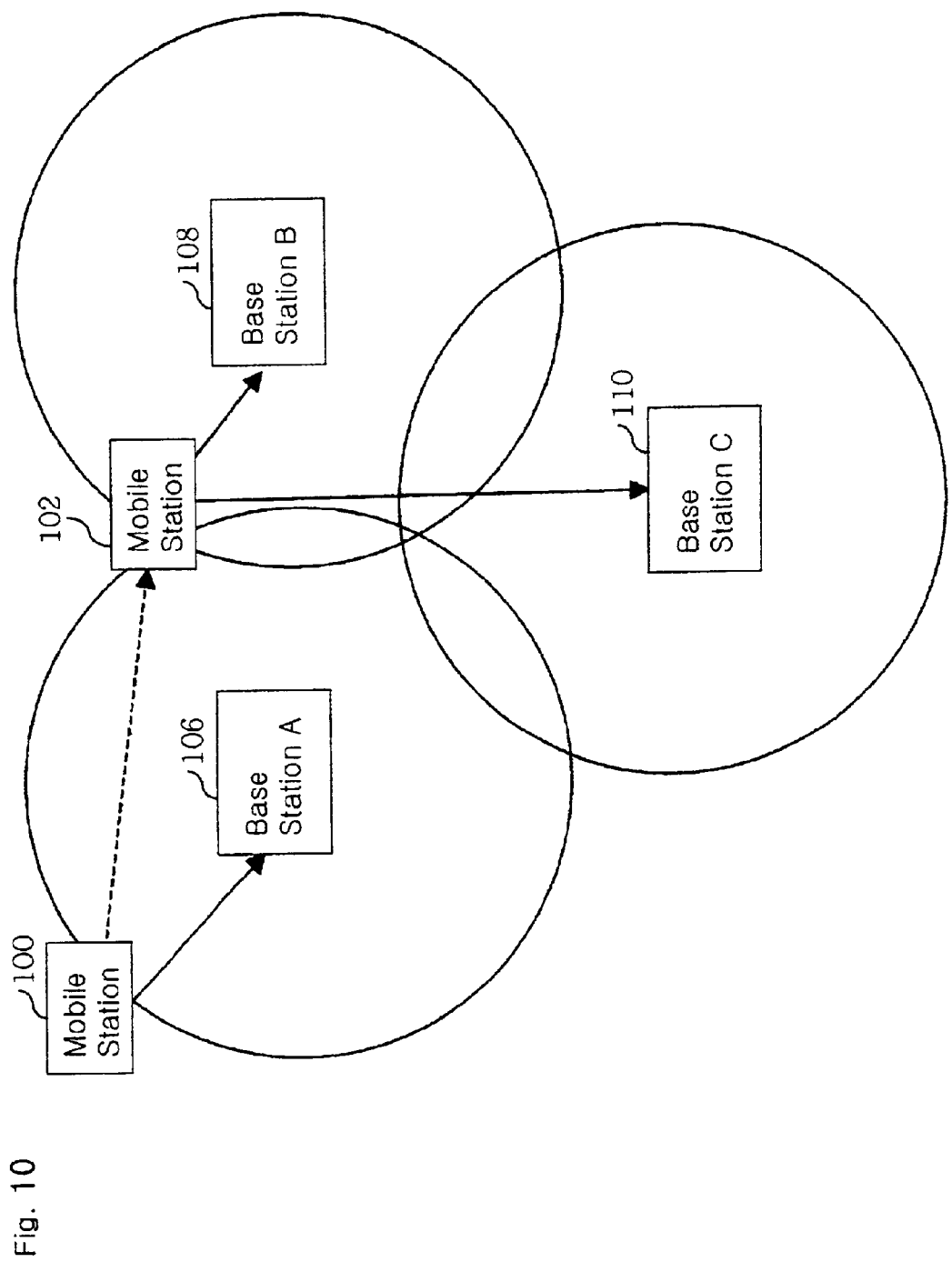
FIG. 10 is a diagram illustrating a process of measuring distance and setting broadcasting areas according to the PAPW/CDMA of the present invention.

FIG. 10 is a diagram illustrating a process of measuring distance and setting broadcasting areas according to the PAPW/CDMA. FIG. 10 exemplifies an operation of a wireless radio employing the PAPW/CDMA that enables reception of broadcasting within a particular area by using a distance measuring method according to the present invention. If the mobile station 100 is to access a base station nearby, the synchronous signals transmitted by the base station should first be searched. Once the synchronous signals of the base station A 106 is searched, a request for access is sent to the base station A 106, which measures a distance to the mobile station 100 using the method as shown in FIG. 8. The measured distance value is transmitted to the mobile station 100. Here, if the distance value received by the mobile station 100 is within the range presented by the base station A 106, the mobile station 100 can receive the broadcasting. If the distance value received by the mobile station 100 is beyond the range presented by the base station A 106, the mobile station stops immediately to receive the signals transmitted by the base station A 106, and searches synchronous signals of other base station while moving toward the base station B 108. If a new base station B 108 is found, a base station 102 receives the signals transmitted by the base station B 108 by the same method as described above. In this manner, the user can receive the signals transmitted by the nearest base station only while moving. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A method for modulating data for a polarity-alternated pulse width code division multiple access (PAPW/CDMA) system, the method comprising:
   multiplying CDMA signals inputted from multiple channels by a mask pattern selected among predetermined mask patterns that have the least peak value;
   reducing the level number of signals by equalizing multiplied CDMA signals according to a predetermined magnitude of levels;
   converting the level number-reduced signals to pulse width signals to generate modulated signals having a constant level; and
   alternately switching a starting polarity of the pulses of the modulated signals between "high" and "low".

2. The method of claim 1, wherein the selected mask pattern is explicitly transmitted via transmission channel.

* * * * *